2,924,606

N - (ALPHA - HYDROXY - BETA - TRIHALOGEN-ETHYL)-PYRROLIDONES AND A PROCESS FOR THE PRODUCTION OF N-(ALPHA-HYDROXY-BETA-TRIHALOGENETHYL)-PYRROLIDONES

Harald Schroeder and August Amann, Ludwigshafen (Rhine), Germany, assignors to Badische Anilin- & Soda-Fabrik Aktiengesellschaft, Ludwigshafen (Rhine), Germany No Drawing. Application February 11, 1958
Serial No. 714,496

Claims priority, application Germany February 13, 1957

2 Claims. (Cl. 260—326.5)

This invention relates to new derivatives of pyrrolidone with excellent soporific properties, and the production of these derivatives.

The new compounds in accordance with our invention can be obtained by reacting pyrrolidone-(2) or its carbon substitution products with trihalogenacetaldehyde. If for example chloral (trichloroacetic aldehyde) is used the reaction mechanism can be illustrated by the following formulae:

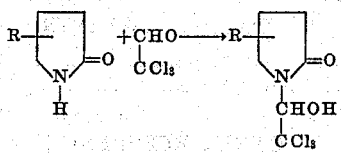

R representing hydrogen or a substituent indifferent to chloral for example an alkyl radical of from 1 to 5 carbon atoms or a cyclohexyl radical. Trichloroacetic aldehyde can be replaced by tribromoacetaldehyde, dibromochloroacetic aldehyde, or bromodichloroacetic aldehyde. Besides pyrrolidone-(2) its carbon alkyl derivatives, e.g., 5-methyl pyrrolidone-(2), 5-ethyl pyrrolidone-(2), 3.4-dimethyl pyrrolidone-(2), 4-cyclohexyl pyrrolidone, and 4-octyl pyrrolidone-(2), are particularly suitable. These pyrrolidone-(2) derivatives reacted with trichloroacetic aldehyde yield the following compounds:

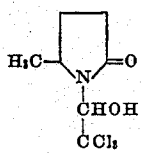
N-(alpha-hydroxy-beta-trichloroethyl)-5-methyl-pyrrolidone-(2)

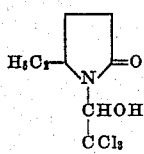
N-(alpha-hydroxy-beta-trichloroethyl)-5-ethyl-pyrrolidone-(2)

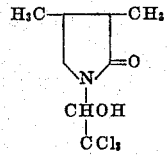
N-(alpha-hydroxy-beta-trichloroethyl)-3,4-dimethyl-pyrrolidone-(2)

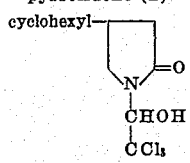
N-(alpha-hydroxy-beta-trichloroethyl)-4-cyclohexyl-pyrrolidone-(2)

Instead of the radical

there is present the radical

when tribromoacetaldehyde has been reacted. The pyrrolidone-(2) or substituted pyrrolidone-(2) radical is more generally represented by P.

Instead of anhydrous trihalogenacetaldehydes, such as chloral their hydrates or alcoholates, e.g. aliphatic alcohols with 1 to 3 carbon atoms, can be used just as well.

The reaction is carried out by combining the two components, it being immaterial which component is added to the other. In general the reactants are used in equivalent amounts. Sometimes it may be advantageous to use one component in excess. The reaction may be carried out in the presence of organic solvents, e.g. hydrocarbons, such as benzene, toluene, petrol ether, or halogenated hydrocarbons, e.g. carbon tetrachloride, or ethers, e.g. tetrahydrofurane or dioxane. The presence of solvents is of particular advantage if either of the two components is a solid.

The reaction takes place at normal temperature, it may however be advantageous to work at slightly elevated temperatures e.g. between 30° and 100° C., or at lower temperatures, e.g. down to 0° C.

When using chloral hydrate as a trihalogenacetaldehyde the water developing in the reaction should be separated by azeotropic distillation with the organic vehicle being recycled.

Of the new compounds obtainable by the process of this invention the derivative of the unsubstituted alpha-pyrrolidone stands out as an excellent soporific in that it combines the valuable properties of the trihalogenacetaldehyde, e.g. chloral or chloral hydrate, with a considerably lower toxicity.

For its lower toxicity the new product is clearly superior to chloral, which can be seen from the following table:

| Product | Minimum soporific dose in mg. per kg. of mouse | Lethal dose (LD50) in mg. per kg. of mouse |
|---|---|---|
| N - (alpha - hydroxy-beta-trichloroethyl)-pyrrolidone-(2) | 150 | 1,000 |
| Chloral (for comparison) | 150 | 600 |

"Minimum soporific dose" is defined as the quantity which produces at least five minutes' sleep in a side position with 50 percent of the treated animals. During this period pinching the animals' tails has no pain effect.

Further advantages of the product according to our invention over chloral are its high melting point which makes for easy pelleting, and its remarkably better palatability.

The parts specified in the examples are parts by weight.

Example 1

850 parts of pyrrolidone-(2) and 1,000 parts of benzene are added to, and stirred well with, 1,470 parts of chloral at normal temperature. The mixture is stirred for 90 minutes at 60° to 65° C. The product which crystallizes out on cooling is filtered off by suction, washed with a small amount of benzene, and dried. After distillation in vacuo the mother liquor yields another crystalline fraction. The total yield is 2,100 parts, i.e. 93.8%, of pure N-(alpha-hydroxy-beta-trichloroethyl)-pyrrolidone-(2) in the form of colorless needles of the melting point 112° C.

Example 2

A solution of 1,650 parts of chloral hydrate in 3,000 parts of benzene are added to a mixture of 850 parts of pyrrolidone-(2) and 1,000 parts of benzene. The mixture is heated to the boil, and the water that forms in the reaction is separated by azeotropic distillation. After separating 180 parts of water 2,500 parts of benzene are distilled off. The crystalline substance which separates on cooling is filtered off by suction, washed with a small amount of benzene, and dried. After distillation in vacuo the mother liquor yields another crystalline fraction. The total yield is 1,940 parts of N-(alpha-hydroxy-beta-trichloroethyl)-pyrrolidone-(2), i.e. 83.6%.

By using chloral hydrate in about 20% excess the yield is increased to 85 to 90% of the theoretical yield with reference to the pyrrolidone-(2) charge.

Example 3

800 parts of chloral are slowly added to, and stirred well with, a mixture of 420 parts of pyrrolidone-(2) and 450 parts of benzene. By cooling from outside the temperature is prevented from rising above 28° C. The reaction mixture is allowed to stand overnight at room temperature, a thick crystalline mass separating. After another 24 hours this crystalline mass is filtered off by suction, washed with benzene, and dried. There are obtained 862 parts, i.e. 75% of the theoretical yield, of N-(alpha-hydroxy-beta-trichloroethyl)pyrrolidone-(2) in the form of colorless fine needles of the melting point 112° C.

By concentrating the mother liquor in vacuo another crystalline fraction can be obtained which is something less pure.

We claim:
1. A compound of the general formula

in which P is a pyrrolidone-(2) radical which is linked to the trihalogenhydroxy ethyl radical by way of the N atom and which is a radical selected from the group consisting of pyrrolidone-(2), a pyrrolidone-(2) substituted by an alkyl radical of from 1 to 5 carbon atoms and a pyrrolidone-(2) substituted by a cycloalkyl group having from 6 to 8 carbon atoms, and wherein $CX_3$ is a trihalogenmethyl group the halogen being selected from the group consisting of chlorine and bromine.

2. The compound of the formula

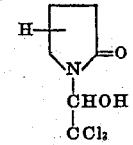

References Cited in the file of this patent

FOREIGN PATENTS

| | | |
|---|---|---|
| 287,802 | Germany | Oct. 2, 1915 |
| 291,222 | Germany | Apr. 7, 1916 |
| 297,847 | Germany | May 24, 1917 |

OTHER REFERENCES

Zief et al.: J. Org. Chem., vol. 8, 1943, p. 1.